Sept. 29, 1942.  F. FERRANDO ET AL  2,297,052
SPRINKLER HEAD
Filed April 23, 1941

INVENTORS
Francesco Ferrando
Giuseppe Ferrando
John A. Naismith
ATTORNEY

Patented Sept. 29, 1942

2,297,052

UNITED STATES PATENT OFFICE 2,297,052

SPRINKLER HEAD

Francesco Ferrando and Giuseppe Ferrando, Menlo Park, Calif.

Application April 23, 1941, Serial No. 389,929

2 Claims. (Cl. 299—64)

The present invention relates particularly to that form of sprinkler head commonly used in the distribution of water over lawns, but that may readily be adapted to other applications, reference being made to our copending application bearing Serial No. 363,510, filed October 30, 1940, now Patent No. 2,273,401, granted Feb. 17, 1942.

In the type of spray or sprinkler head herein considered a jet of liquid is discharged against a diffusion vane from the interior thereof, and the vane thereby caused to rotate on its axis and disperse the liquid through the surrounding atmosphere and on to adjacent surfaces.

In devices of the character indicated the most satisfactory construction includes some form of anti-friction bearings and consequently necessitates the incorporation of a multiplicity of parts and, for its ease and smoothness of running liberal lubrication is required.

It is, therefore, one object of the present invention to provide a device of the character indicated constructed and arranged in such a manner that but few parts are required in its construction, and wherein those parts may be economically produced and assembled.

It is another object of the invention to produce a device of the character indicated wherein the anti-friction mounting of the rotating part upon the stationary part is so arranged that little or no lubrication is required for its proper operation, and wherein the bearing will at all times remain substantially free of the liquid moving through the head.

Figure 1:
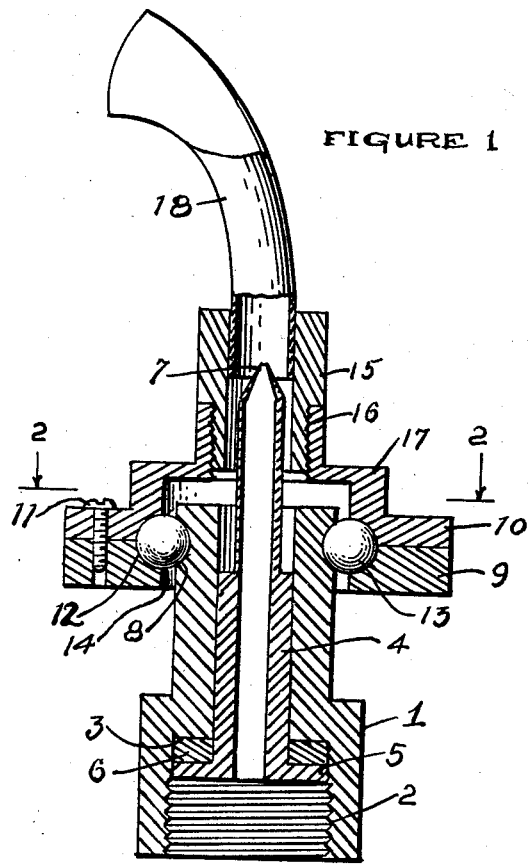
Figure 1 is a longitudinal section through a device embodying our invention, partly in elevation.
Figure 2:
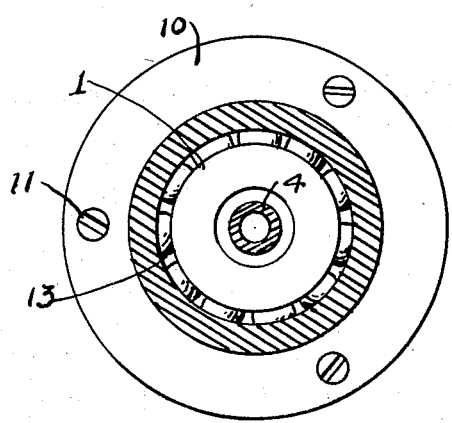
Figure 2 is a sectional view on line 2—2 of Figure 1.

In the particular embodiment of the invention herein disclosed, we show at 1 a base member which may be mounted on any suitable liquid delivery means through the medium of a connection, not shown, threaded into the member at 2.

The member 1 is tubular in form with a shoulder at 3. Slidably inserted in the tubular member 1 is a nozzle 4 having a flange 5 seating against packing 6 on the shoulder 3, and provided with a discharge opening of reduced size at 7. At 8 is shown a ball race formed in the member 1 adjacent its free end and in concentric relation to its axis.

The parts described comprise the non-rotating portion of the device, and in the present instance consists of two members only, the base member and the nozzle.

The rotating portion of the device comprises an annulus 9 and an annulus 10 secured together by screws 11. These parts 9 and 10 have the same inside and outside diameters, and the inside diameter of the element formed by their combination is a little greater than the outside diameter of the base 1 at the end where the raceway 8 is formed.

At 12 is shown a raceway formed in the part 9—10 to cooperate with the raceway 8 in receiving the ball bearings 13. It will be observed that in the assembly described the balls 13 not only permit the free and easy rotation of part 9—10 on the base 1, but they also support the part 9—10 thereon in spaced relation to the base 1 leaving an open annular passage 14 which permits the free escape of any liquid entering the bearing.

The liquid diffusing vane 18 may be of any desired shape, and may be supported with its receiving end in axial alignment with the discharge end 7 of the nozzle in any desired manner. In the present instance the member 18 is mounted in a nut 15 threaded as at 16 into an outwardly extending part 17 of annulus 10. Here the part 17 forms a closed top for the bearing, preventing the entrance of any foreign matter from the outside. Such liquid as may work back past the nozzle end 7 will flow freely past the ball-bearing, but there will be little of this because the force of the jet discharged from the nozzle end 7 will create an outward suction of air past the said bearing and return such liquid to the main stream, there being no dead-air pocket between the bearing and the nozzle end.

Having thus described our invention, what we claim as new and desire to secure by Letters Patent, is:

1. A sprinkler head comprising a tubular base member having a coupling portion on one end and a nozzle member disposed axially therein to extend beyond its other end, and having a bearing race formed in its outer surface adjacent the latter end, anti-friction bearings disposed in said race, a member disposed to encompass the last named end of the base member and having a raceway formed therein to receive said anti-friction bearings, and a liquid diffusing vane mounted on the last named member in operative relation with the nozzle member.

2. A sprinkler head comprising a tubular base member having a coupling portion on one end and having an anti-friction bearing raceway formed on the outer surface of its other end in concentric relation to its axis, a nozzle member disposed in the base member to extend axially therethrough, anti-friction bearings mounted in the said raceway, and a spraying member operatively mounted on the said anti-friction bearings and in operative relation with said nozzle member and in spaced relation to said base member.

FRANCESCO FERRANDO.
GIUSEPPE FERRANDO.